US008458018B1

(12) United States Patent  (10) Patent No.: US 8,458,018 B1
Donelian et al.  (45) Date of Patent: *Jun. 4, 2013

(54) ELECTRONIC TRADING SYSTEM AND METHOD FOR MARKETING PRODUCTS AND SERVICES

(75) Inventors: Stephan V. Donelian, New York, NY (US); Steven Cohen, Brooklyn, NY (US); Fred G. Slavin, Manalapan, NJ (US); Michael Trenk, Scarsdale, NY (US); Judah Kaplan, Teaneck, NJ (US); James E. Lewis, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 2399 days.

This patent is subject to a terminal disclaimer.

(21) Appl. No.: 09/695,093

(22) Filed: Oct. 24, 2000

(51) Int. Cl.
*G06Q 30/00* (2012.01)
(52) U.S. Cl.
USPC ............... 705/14.1; 705/14.23; 705/14.34; 705/26.1; 705/26.35; 705/26.62
(58) Field of Classification Search
USPC .............. 705/14.1, 14.23, 14.34, 26.1, 26.35, 705/26.62, 14, 26
See application file for complete search history.

(56) References Cited

U.S. PATENT DOCUMENTS 5,661,517 A * 8/1997 Budow et al. ............... 725/60
6,205,433 B1 * 3/2001 Boesch et al. .............. 705/26
6,516,302 B1 * 2/2003 Deaton et al. .............. 705/14
2008/0208663 A1 * 8/2008 Walker et al. ............... 705/7
2012/0123946 A1 * 5/2012 Walker et al. .............. 705/50

OTHER PUBLICATIONS

Dialog file 20, # 10279554 "Offerr: Book Yourself Free cassettes" Mar. 25, 2000, Birmingham Post, p. 16.*
"Accounting for Transactions Involving Barter Credits" The CPA Journal, Jul. 1999 issue.
"Internet Barter Signs Maytag, Carl Sandburg College in Innovative Barter Transactions," "3-Way Agreement Lets Maytag Sell Refrigerators and Train Employees, College Makes Physical Plant Improvements Using BarterTrust Dollars," Business Wire, Inc., Mar. 27, 2000.
"Corporate Trading Rids Firms of Last Year's Merchandise," Journal of Commerce, Inc. Global Commerce, Gordon Platt, Author, Dec. 1, 1999.
"Bank to Redeem Barter Credits," Journal of Commerce, Inc., Global Commerce, Gordon Platt, Author, Oct. 20, 1999.

(Continued)

*Primary Examiner* — Raquel Alvarez
(74) *Attorney, Agent, or Firm* — Goodwin Procter LLP (57) ABSTRACT

A consumer is provided with a first asset in return for a promise to earn an agreed to number of points over an agreed to redemption period. The consumer subsequently earns the points by purchasing one or more second assets. At least one of the second assets is different than the first asset. Each purchase has an associated point value, at least one of the point values being different than at least one other point value. An electronic trading system includes a first set of web sites where a consumer can select a first asset it wants to obtain in return for a promise to earn points by making future purchases of one or more second assets.
The number of points which the consumer must earn varies as a function of which of the first assets is selected by the consumer. The consumer can fulfill its obligation to earn the stated number of points by purchasing one or more second assets at a second set of web sites. Each of the second assets has an associated point value.

58 Claims, 6 Drawing Sheets

OTHER PUBLICATIONS

"Solutions/The Problem:/Can Bartering Help Your Comapny, and What Do You Need to Get Started," Newsday, Inc., Executive Edition, Laura Koss-Feder, Author, Jul. 19, 1999.

"Accounting for Transactions Involving Barter Credits," Bell & Howell Information and Learning, CPA Journal,vol. 69, No. 7, p. 56, Joel Steinberg, CPA, American Express Tax and Business Services, Author, Jul. 1999.

Corporate Barter Firms Can Swap Your Product or Service for Almost Anything You Need (Let's Make a Deal), UMI, Inc. ABI/Inform, Bill Communications Successful Meetings, vol. 47, No. 13, pp. 71-72, Robert Carey, Author, Dec. 1998.

"Business-to-business Bartering" UMI, Inc. ABI/Inform, Office Systems Magazine Corp. Office Systems, vol. 15, No. 11, pp. 13-16, Jean Buchanan, Author, Nov. 1998.

"Barter Companies Thriving in Tough Economic Climate Manufacturers Find Canceled Orders Bring Good Prices Paid in Trade Credits," Journal of Commerce, Inc. Global Commerce, p. 7A, Rosalind McLymont, Author, Oct. 19, 1998.

"Barter Companies Thriving in Tough Economic Climate Manufacturers Find Canceled Orders Bring Good Prices Paid in Trade Credits," vol. 18, No. 36, p. 26, UMI Inc., Copyright P&L Publications Inc., Business Dateline, Boston Business Journal, Small Business, Roberta Holland, Oct. 16-22, 1998.

"Merger Creates North American Barter Giant," Business Editors, Dec. 23, 1999.

"Barter Companies Thriving in Tough Economic Climate," Journal of Commerce, Inc., Rosalind McLymont, Oct. 19, 1998.

Tapping New Markets Through Barter; Atwood Richards Inc. Conducts an International Bartering Service for Business; Brief Article, Information Access Company, a Thompson Corporation Company, ASAP, Bill Communications Inc. Sales & Marketing Management, Tricia Campbell, Author, Oct. 1, 1998, p. 41.

"Barter Paying Off for Firms Like Tyson Ore-Ida," Information Access Company, a Thompson Corporation Company, ASAP, Maclean Hunter Media Inc., Frozen Food Age, May 1998, vol. 46, Section 10, p. 54.

"More Hoteliers Hit Room-Bartering Bonanza" Information Access Company, a Thompson Corporation Company, ASAP, Advanstar Communications Inc., Hotel & Motel Management, Marty Whitford, Author, Apr. 6, 1998, vol. 213, Section 6, p. 56.

"The Booming Barter Business," Journal of Commerce, Inc., p. 1A; News Section, Apr. 1, 1997, Paula L. Green, Author.

"When Barter is Better; Corporate Bartering" Information Access Company, a Thompson Corporation Company, ASAP, American Management Association Management Review, vol. 85, No. 2, p. 58, Angela Briggins, Author, Feb. 1996.

"The Business of Barter," Business and Industry, What an Accountant Should Know About it, The Business of Barter, Mar. 1998, Phyllis Malitz, Author.

"Why is Corporate Barter?" Business Economics, Information Access Company, A Thompson Corporation Company, ASAP, Copyright 1996 National association of Business Economists, No. 2, vol. 31, p. 36, Apr. 1996, Nigel M. Healey, Author.

"Trade You for a Hotel Room: Barter is Like Having a No-Interest Credit Card, Businessman Says," The Gazette (Montreal), Copyright 2000 Southam Inc., Jun. 10, 2000.

"Land a Deal Down Under," Smart Cash, Bell & Howell Information and Learning, Far East Trade Press Ltd., Asian Business, vol. 36, No. 6, p. 49, Jun. 1, 2000.

Discussion of prior art.

* cited by examiner

AUTOMOBILES

HONDA
MIDSIZE VEHICLES
CIVIC
2000 LX SEDAN
COLOR: GREEN
MILEAGE: 0

| DEALER NAME | PRICE IN US DOLLARS | CONSUMPTION POINTS |
|---|---|---|
| ABC DEALER | $ 23,250.00 | 1,500 POINTS |
| BOB'S HONDA DEALER | $ 23,500.00 | 2,000 POINTS |
| HONDA USA DEALER | $ 24,250.00 | 4,500 POINTS |
| TRUSTWORTHY HONDA DEALER | $ 22,000.00 | 0 POINTS |
| USA OLDEST DEALER | $ 32,500.00 | 8,00 POINTS |

FIG. 8

ELECTRONIC TRADING SYSTEM AND METHOD FOR MARKETING PRODUCTS AND SERVICES

BACKGROUND OF THE INVENTION

The present invention relates to a process and system for marketing products and services, and in particular to a process and system which allows buyers to obtain assets in exchange for promises to make future purchases of other products and services.

Traditional purchase transactions require buyers to have sufficient and available funds. Alternatives to cash transactions include a variety of credit in the form of loans and credit lines and have long been recognized as available mechanisms for buyers to obtain assets without an initial investment of money.

Purchasers relying upon credit to obtain assets may incur charges including interest and late-payment penalties. Interest rates vary depending upon the type of loan and the type of agreement with lenders. Credit cards may charge no interest if monthly bills are paid immediately when due, usually within thirty days of the receipt of the credit card invoice. However, if a credit card invoice is not paid within thirty days, additional charges including interest and late-payment penalties may accrue. Other types of loans may impose charges on the borrower including interest which begins to accrue immediately upon the start of the loan.

In place of credit and cash purchases, new types of purchase transactions have emerged in the commercial marketplace. Suppliers recognize the value of guaranteed future purchases and offer goods and/or services to buyers in exchange for promises to purchase a minimum number of related goods and/or services in the future. For example, book seller A offers a buyer ten books in exchange for a promise to purchase a minimum number of books within a specified time period. When the buyer purchases the agreed to number of books within the specified time, he fulfills his obligation and the transaction is complete. The buyer obtains the initial ten books at the cost of guaranteeing book seller a minimum number of future purchases. In these types of "book club" transactions, buyers are obligated to fulfill their minimum orders by purchasing from the original seller. In the preceding example, if the buyer purchases a minimum number of books within an agreed to time period from book seller B, his obligation to book seller A would not be discharged. Examples of companies offering goods and services in exchange for promises to purchase goods in the future include BMG Music Service, Columbia House, Quality Paperback Book Club and the Doubleday Book Club.

In addition to purchase transactions wherein goods and/or services are obtained in advance and in exchange for promises to purchase a minimum quantity of goods and/or services in the future, marketing programs based upon customer loyalty developed other types of exchange. Frequent-flyer programs and the like, for example, have gained wide popularity in many industries.

Frequent-flyer programs encourage buyers to purchase travel-related services, often air travel, at an agreed to price. When a buyer purchases air travel, he or she subsequently earns credits toward future air travel, usually measured in miles, which can be redeemed within a specified time period. When the buyer purchases additional air travel from the same airline in the future, the balance of accumulated miles increases.

These programs further reward customer loyalty by increasing the rate at which frequent-flyer miles are earned as buyers continue to purchase from the same airline. With few exceptions, frequent-flyer miles must be redeemed for air travel or travel-related service, for example car rentals and hotels. Unlike the book club example discussed above, frequent-flyer programs do not offer air travel up front and in advance, and do not obligate the buyer to purchase anything in the future. Examples of companies employing frequent-flyer types of incentive programs include United Airlines, Hilton Hotels, and United Parcel Service. These companies offer related future services in exchange for present purchases.

Other types of incentive-based point programs encouraging buyers to purchase are growing rapidly. Many companies have implemented programs in which buyers are awarded points whenever purchases are made. Restrictions on the buyer usually include the method of payment such as use of a specific credit card or using a specific purchasing venue such as a global communication network, for example the Internet. A further restriction limits buyers to choose from suppliers that accept earned points in lieu of money or credit payment. Companies accepting specific points in exchange for goods and/or service do not accept unrecognized points awarded by companies involved in different programs.

In most points programs, a buyer is credited points based upon purchases at agreed to rates, for example, 1 point per one U.S. dollar. Points earned through qualified purchases are assigned to the purchaser after receipt of the merchandise and/or service. The points are available for redemption after a minimum interim time period subject to cancellation based upon unavailable credit, product returns or order cancellation. Redeemable points may be used for goods and/or services in the future only after this interim period has expired.

Unlike the book club and frequent-flyer program examples discussed above, incentive-based points programs often allow points to be redeemed for unrelated goods and/or services. For example, a buyer will purchase furniture and earn 150 points which she later redeems for a personal stereo from a different supplier. Examples of companies offering incentive programs featuring points for purchases include MyPoints.com, Yahoo!Shopping.com and AltaVistaRewards.com. Other companies in addition to dot-com companies offering points for purchases include Radisson Hotels, American Express, and Marriott Hotels.

SUMMARY OF THE INVENTION

According to one aspect of the present invention, a consumer is provided with a first set of assets from a first set of suppliers in return for a promise to make future purchases of one or more second assets. The first set of assets can consist of a single asset or a plurality of assets. Similarly, the first set of suppliers can consist of a single supplier or a plurality of suppliers.

The second assets can be purchased from one or more of the suppliers of the first set of suppliers. Alternatively, the second assets can be purchased from a second set of suppliers. The second set of suppliers can be totally different than the first set of suppliers, or can include at least some suppliers from the first set of suppliers. At least one of the suppliers of the first set of suppliers can be a financial institution. At least one of the suppliers of the second set of suppliers can be a financial institution.

The first and second assets can include a wide range of assets. Preferably, at least one of the second assets is a different category of asset than the assets of the first set of assets. For example, each asset of the first set of assets could be a product and at least one of the second assets could be a service. Similarly, each asset of the first set of assets could be a product and at least one of the second assets can be a product and at least one other of the second assets can be a service. Alternatively, each asset of the first set of assets could be a service and at least one of the second assets could be a product or each asset of the first set of assets could be a service and at least one of the second assets could be a service which is different in kind than the first service. Even if the first and second assets are all products or all services, they could be different categories. For example, the first assets could be records and the second assets could be desks. Alternatively, the first assets could be travel services and the second assets could be advertising services. In contrast, different musical recordings would be part of a single category of assets. In the preferred embodiment, the promise to make future purchases of one or more second assets comprises a promise to earn an agreed to number of points, at least some of the points being earned by purchasing one or more second assets.

The assets can include products, services and/or a monetary payment. However, an asset can also be anything of value such as contractual rights or intangible property. The consumer preferably obtains the first asset by selecting the first asset from a plurality of different categories of assets. The point values for at least one of the first assets is preferably different than the point values from at least one other of the first assets. The first assets are preferably offered by at least two different suppliers. The suppliers can be manufacturers, retailers, distributors, trading houses or any other supplier of goods. The suppliers may themselves own title to the goods or may simply act as an intermediary for selling the goods of third parties.

When the consumer selects the first asset, he or she is provided with the asset from the supplier offering that asset and the supplier receives a payment for the asset from a financial institution supporting the underlying transactions in the marketplace. In return, the financial institution receives a portion of each payment made when the customer subsequently purchases one or more second assets.

In the preferred embodiment, the second assets are offered by a plurality of different suppliers, each of whom sets both a price for the purchase of the second asset and a number of consumption points which will be earned as a result of the purchase of the second asset. The financial institution receives a payment equal to the dollar value of the points which the consumer earns when payment is made for the second asset.

In order to encourage the consumer to purchase as many second assets as possible, in as short a time as possible, it is preferred that an interest charge be applied to the outstanding balance of consumption points which must be earned by the consumer. The interest, which preferably increases over time, can also be applied on the average daily balance or any alternative interest calculation method. An interest charge is also preferably imposed to compensate the Financial Institution for the cost of the funds advanced and to allow for appropriate risk management. To this end, a ledger is maintained to keep track of the balance of consumption points which must be earned by the consumer. Each time an additional second asset is purchased, the ledger balance is reduced. The outstanding ledger balance increases on a periodic basis as a function of the agreed to interest rate(s).

In the preferred embodiment, the consumer has the option of paying off part or all of its consumption point balance by making a cash payment having an agreed to point value.

The present invention is also directed towards a trading system comprising:

a first set of sites where a consumer can select the first asset he or she wants to obtain in return for a promise to earn at least some of said points by making future purchases of one or more second assets, the number of points which the consumer must earn varying as a function of which of the first assets the customer selects;

a second set of sites wherein the consumer can fulfill its obligation to earn the stated number of points by purchasing one or more second assets, each of the second assets having an associated point value.

In the preferred embodiment, a plurality of different suppliers offer one or more of the second assets. Information is preferably provided at the second set of sites indicating the number of points which will be earned by the consumer when he purchases a given second asset. Each supplier preferably determines a purchase price for each second asset it lists along with the number of points which will be earned for the purchase of that second asset.

The first set of sites may be a single site or may be a plurality of sites. Similarly, the second set of sites may be a single site or a plurality of sites. Alternatively, both the first and second sites may be a common site.

The present invention is also directed towards a process for marketing products and/or services, the process comprising:

providing a consumer with a first set of assets from a first set of suppliers in return for a promise to make future purchases of one or more second assets from a second set of suppliers, the second set of suppliers including at least one supplier which is not included in the first set of suppliers.

The present invention is further directed towards a process for enabling a consumer to obtain assets, the process comprising:

entering into a contract under which a consumer is provided with an asset in return for a promise by that consumer to earn an agreed to number of points over a redemption period; and the consumer earning at least some of the agreed to number of points by purchasing one or more second assets, each purchase having an associated point value.

The trading system is preferably an electronic trading system carried out on a global communication network and the first and second sets of sites are preferably web sites.

One or more electronic terminals are preferably associated with a financial institution via which the financial institution makes payment to the supplier who supplied the selected first asset. The first assets offered at the first set of web sites are preferably a plurality of services and a plurality of products. Each of the first assets is preferably listed with an associated number of points which must be earned by the consumer in return for the first asset selected.

One or more computers preferably keep track of the number of points owed by each consumer. The computer periodically adds interest to the balance of points owed by the consumer.

Other features and advantages of the present invention will become apparent from the following description of the invention which refers to the accompanying drawings.

BRIEF DESCRIPTION OF THE DRAWING(S)

For the purpose of illustrating the invention, there is shown in the drawings a form which is presently preferred, it being understood, however that the invention is not limited to the precise arrangements and instrumentalities shown.

DETAILED DESCRIPTION OF EMBODIMENTS OF THE INVENTION

Figure 1:
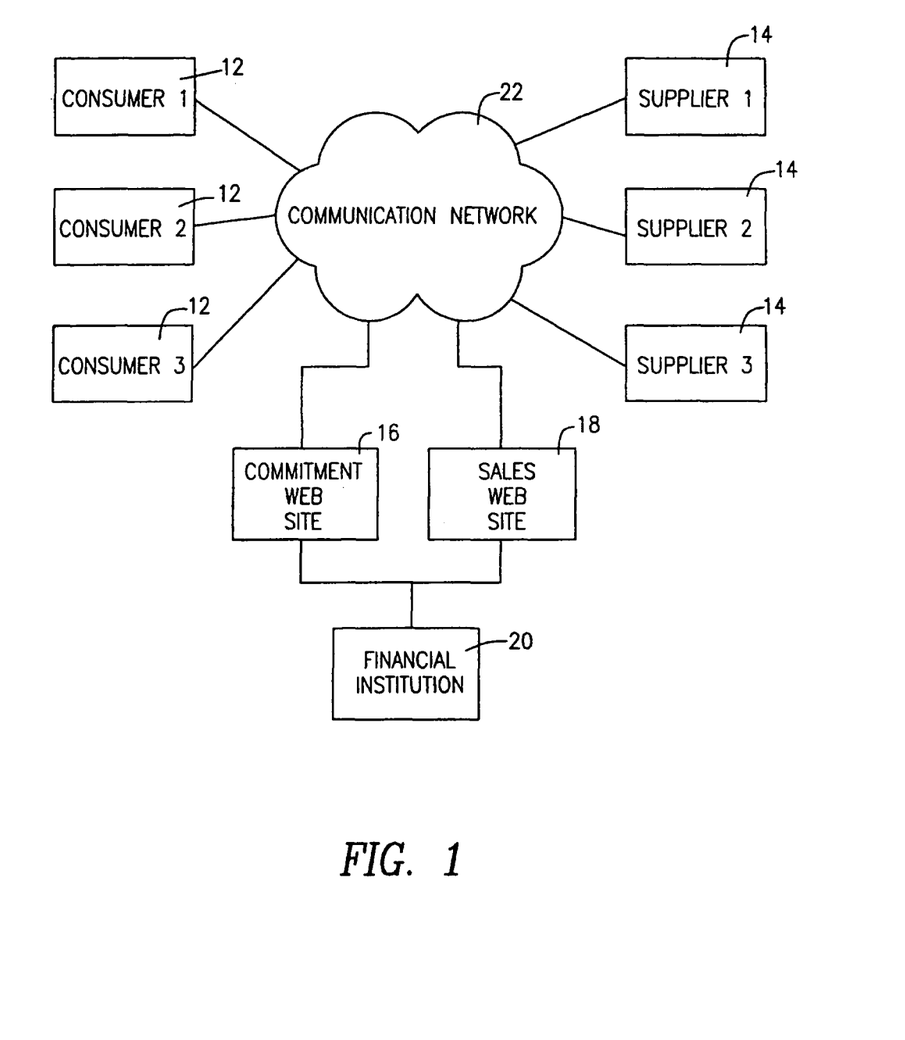
FIG. 1 is a schematic diagram illustrating an electronic trading system in accordance with the preferred embodiment of the present invention.

Referring now to the drawings where like numerals indicate like elements, there is shown in FIG. 1 an electronic marketplace constructed in accordance with the principles of the present invention and designated generally as 10. Electronic marketplace 10 includes a commitment web site 16 and a sales web site 18 which can be accessed by a plurality of consumers 12 (individuals, corporations or other entities) and a plurality of suppliers 14 over a communication network 22, preferably a global communication network such as the Internet. A financial institution 20, in communication with web sites 16 and 18, finances the underlying transactions taking place in the electronic marketplace 10. While the financial institution 20 is shown as being in direct communication with the web sites 16, 18, it can also be connected to the web sites 16, 18 over the communications network 22 if desired.

Two basic types of transactions take place in the electronic marketplace 10. The first is the purchase of goods or services on commitment web site 16 in return for a commitment to make future purchases of goods and services on sales web site 18. The second is the purchase of goods and/or services on sales web site 18 to fulfill this commitment.

The transactions taking place on commitment web site 16 are three-way transactions. Suppliers 14 place products and/or services on the commitment web site 16 which they are willing to sell to consumers 12 in return for a cash payment from the financial institution 20. The consumer 12 purchases the products and/or services by making a promise to the financial institution 20 to purchase other goods or services (which may be the same as or different than those obtained on the commitment web site 16) on the sales web site 18.

Financial institution 20 pays the supplier 14 who supplies the goods and/or services to the consumer 12 an agreed to amount for the sale of its goods or services based upon the size of the commitment made by the consumer 12. This amount is preferably less than the full retail cost for the products in question so that the financial institution effectively gets a discount on the products which are supplied to the consumer 12.

In most cases, the financial institution 20 will pay the supplier 14 directly. However, if the supplier 14 is acting as a distributor or other type of intermediary for third parties, the payment can be made either directly to the third party or a portion of the payment, for example, a portion corresponding to a commission, can be made to the supplier 14 and the remainder made to the third party who actually supplied the goods.

In the preferred embodiment, the consumer 12 agrees to purchase sufficient goods and/or services on sales web site 18 to earn an agreed to number of consumption points. The number of consumption points which the consumer 12 obligates him or herself to earn will be dependent upon the value of the goods or services he or she purchases on the commitment web site 16. A less expensive product or service will require a relatively small commitment (e.g., 100 consumption points) while a relatively expensive product or service will require a relative large commitment (e.g., 1500 consumption points). The financial institution 20 will pay supplier 14 an amount corresponding to the number of consumption points which the consumer 12 has committed to earn in return for the product or service the consumer purchased on the commitment web site 16. For purposes of simplicity, it will be assumed in the following examples that the financial institution 20 and each of the suppliers 14 agree that each consumption point will be worth $1.00. However, any fraction or multiple of one dollar (or other currency) may be used. Using this assumption, if the supplier 14 sells a product or service in return for a commitment by the consumer 12 to purchase sufficient products and/or services on sales web site 18 to earn 300 commitment points, the financial institution will pay supplier $300.

In the preferred embodiment, the financial institution 20 maintains web sites 16 and 18 and will charge suppliers 14 a service fee (e.g., 3%) for all transactions that take place on the web site. Alternatively, the web sites 16 and 18 can be maintained by one or more third parties who may charge a transaction fee in addition to or in lieu of the transaction fee charged by the financial institution 20. Assuming that the financial institution 20 charges the supplier 14 a transaction fee of, e.g., 3% of the purchase price, the financial institution 20 will pay the supplier $291.00 ($300.00 less the transaction fee of $9.00) for the transaction.

Figure 2A:
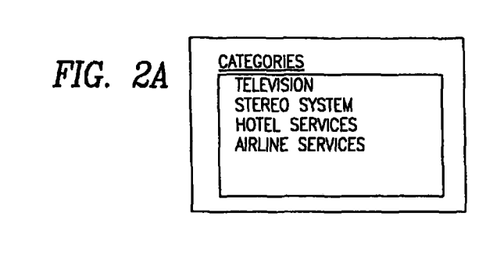
FIGS. 2a-2d are exemplary web pages which can be used by a consumer to obtain an asset in return for a future obligation to purchase additional products and/or services.

A simple example of the types of choices which will be available to the consumer is shown in FIG. 2A. The customer will be presented with one or more categories of products and/or services which he may purchase in return for a commitment to make future purchases of products and/or services on the sales web site 18. In the example shown, a small number of choices are available. However, any number of choices, presented in any format, can be made available to the consumers 12.

Figure 2B:
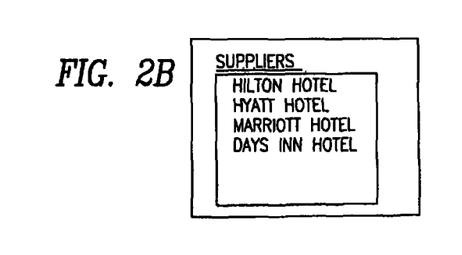
Figure 2C:
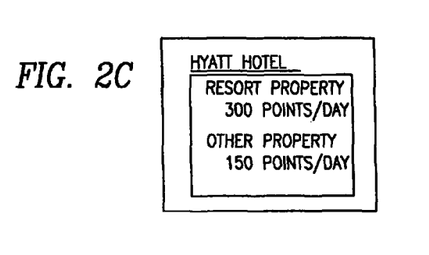

Assuming that the consumer wants to purchase hotel services, he or she selects the category "hotel services." This can be done in any desirable manner, such as by navigating the web page and clicking on the desired category. He or she will then be provided with a list of different hotels who are offering their services on the commitment web site 16. This is shown in FIG. 2B as a separate web page. Alternatively it could be a pull-down menu on the first web page shown in FIG. 2A or other desired presentation. The consumer then selects an appropriate supplier, for example, Hyatt Hotels. Upon doing so, the consumer 12 is presented with various options relating to the type of services he can purchase. In the example shown in FIG. 2C, Hyatt Hotels is offering two types of services. It will sell time at its resort properties for an obligation to earn 300 consumption points for each day that the consumer stays at the resort property. It is also willing to sell time at its non-resort properties in return for an obligation to earn 100 consumption points for each day that the consumer stays at a non-resort property.

Assuming that the consumer selects the resort property option, he or she will be asked how many days he wishes to purchase. In the example shown in FIG. 2D, the consumer is shown a separate screen which allows him or her to enter the number of days desired and to accept his or her entry. Assuming that the consumer selects five days, he or she will be entitled to a five-day stay at a Hyatt resort property and will have obligated his or herself to earn 1,500 consumption points over a specified redemption period (e.g., two years) by making future purchases of products and/or services at the sales web site 18 during the redemption period. The redemption period can be a preset period for all transactions or can be agreed to on a transaction by transaction basis. If the consumer has not earned a sufficient number of consumption points at the end of the redemption period to fulfill his or her commitment, the consumer agrees to pay the balance of the consumption points (at an agreed to conversion rate) to the financial institution 20.

Figure 2D:
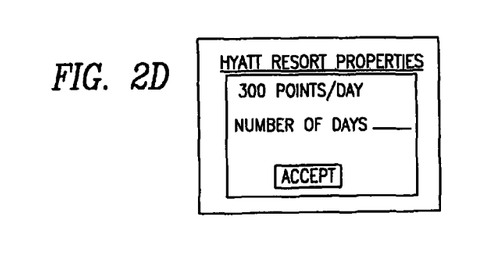

Once the transaction taking place at obligation web site 16 is complete, the financial institution 20 provides a payment to Hyatt Hotels based on the number of points committed to by the consumer. The financial institution 20 will have already entered into a contract with Hyatt Hotels under which it agrees to pay a predetermined dollar value per point to Hyatt Hotel in return for every consumption point a consumer 12 commits to in return for the service provided by Hyatt Hotels. Similar contracts are made with each supplier 14 who sells its products on the commitment web site 16.

Summarizing the foregoing example, the consumer 12 has purchased five days at Hyatt Hotel resort properties in return for a commitment to the financial institution 20 to purchase sufficient products and/or services on sales web site 18 to earn 1,500 consumption points (plus interest). Hyatt has sold five days at its Hyatt Hotel resort properties in return for a cash payment of $1,465.00 ($1,500.00 less the transaction fee of $45.00) from the financial institution 20. The financial institution 20 has received an up-front payment of $45.00 together with a promise from the consumer 12 to make sufficient future purchases on the sales web site 18 to fully repay the financial institution the $1,500.00 it has laid out (with interest).

In order to ensure the success of the electronic marketplace 10, it is desirable that as many purchases be made on the sales web site 18 as possible. This will increase the number of suppliers 14 who sell their products on the sales web site 18 and will make the sales web site 18 more competitive. It is also advantageous to the financial institution 20 to obtain repayment of the money it paid to the supplier ($1,500.00 in the foregoing example) as soon as possible. Since Financial institution 20 wishes to minimize its risk, it would prefer that the consumer 12 make sufficient purchases on sales web site 18 quickly to fulfill its consumption points obligation, and thus remove the risk.

In order to encourage the consumer 12 to make as many purchases on sales web site 18 as possible, in as short a time as possible, the number of consumption points owed by the consumer 12 (the consumption point balance) preferably increases over time. This can be done on any periodic basis in any manner desired. For example, the balance of consumption points may be increased every month at an agreed to interest rate (e.g., 1% percent). Since the consumer 12 will presumably be earning consumption points by making purchases on the sales web site 18 during the redemption period, the consumption point balance will be reduced over time and the interest rate is applied only to the outstanding balance at the anniversary of each interest period (e.g., once per month).

To further encourage the consumer to purchase more products on sales web site 18, the percentage rate preferably increases over time. For example, during the first six months of the redemption period, the commitment point balance will be increased by 1 percent per month, during the following six month period, it will be increased by 1¼ percent month, during the following six month period by 1½ percent per month, etc. Whether a constant or variable interest rate is used, the rate can vary from consumer to consumer based on various factors including the consumer's credit rating.

As noted above, the consumer 12 normally pays off his consumption point balance by purchasing goods and/or services on the sales web site 18. In the preferred embodiment, the consumer is also provided with the option for paying a cash amount in lieu of earning consumption points. For example, the consumer 12 can be given the option of purchasing consumption points at $1.00 per consumption point. Thus, the consumer can reduce or pay off his or her obligation to the financial institution 20 at any time during the redemption period.

As noted above, the consumer 12 will normally satisfy its consumption point balance by making purchases of products and/or services on the sales web site 18. To this end, a plurality of suppliers 14 will list their products on the sales web site 18 and will specify a purchase price to be paid and a consumption point value to be earned for each purchase. Each supplier 14 can preferably set his own price and associated point value for the goods or services in question. The number of points provided will affect the price of the goods and services charged by the supplier 14 since a payment will be made to the financial institution 20 as a function of the number of consumption points awarded. For example, if a product is listed with a price of $1,000.00 and the number of points to be earned by the purchase of that product is 200 points, then the supplier 14 will receive a cash payment equal to the sales price less the dollar value of the points awarded (i.e., $800.00). As in the case of the commitment web site 16, it is expected that the financial institution 20 will maintain the sales web site 18 and will charge a transaction fee (e.g., 3%) for all sales that take place on the sales web site. While it is preferred that the financial institution 20 maintain the web site, it is possible that one or more third parties will maintain one or more sales web sites 18 and that those parties may charge a transaction fee in lieu of or in addition to the transaction fee charged by the financial institution 20.

Dependent upon his or her current consumption point balance and the current interest rate being applied to that balance, the value of each consumption point to the consumer 12 varies. If a consumer 12 has a large consumption points balance, or if the interest rate being applied to the consumption point balance is high (because it is late in the redemption period), he or she will have an additional incentive to earn consumption points and may be willing to pay more for a product or service to obtain those points. In contrast, if the consumer 12 has a small consumption point balance, or is paying a relatively low interest rate on its consumption point balance, he or she may be more interested in obtaining the best price for a given product. This is an opportunity for suppliers 14 to sell their products and/or services on the sales web site 18 at various price/consumption point levels in competition with one another. It is also an opportunity for consumers 12 to select the particular price/consumption point level which is most attractive to him or her.

In the preferred embodiment, the consumer 12 visits the sales web site 18 and selects a category of products and/or services he wishes to purchase. By way of example, but not limitation, this can be started by entering a first web page shown in FIG. 4 and listing the categories of products and services being offered.

Figure 4:
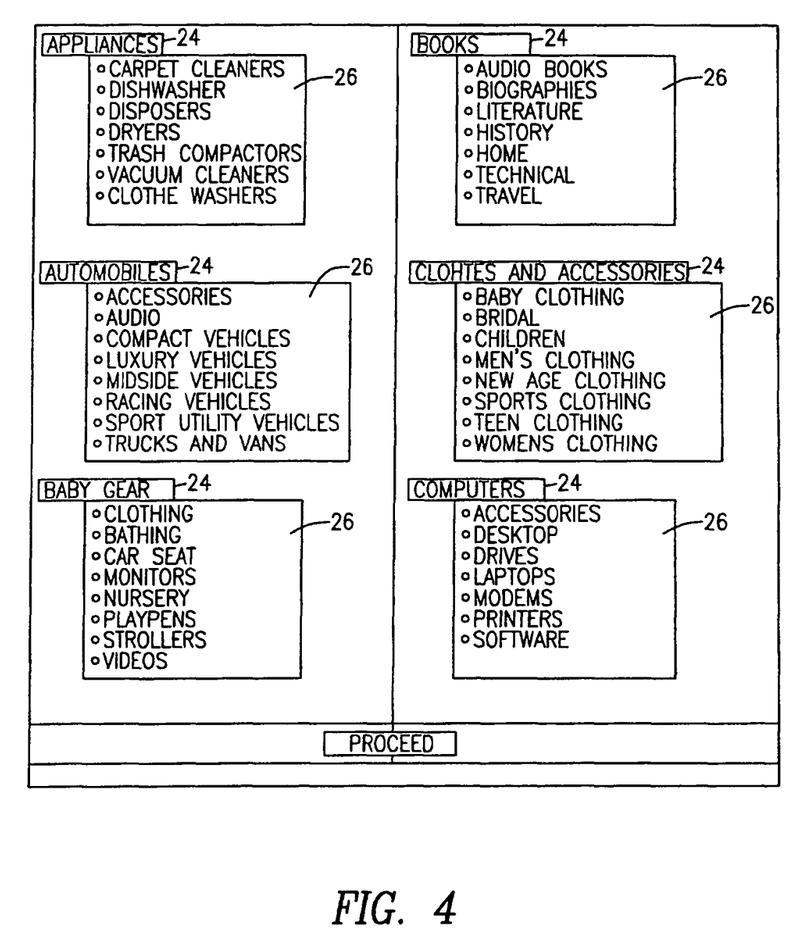
FIG. 4 is a web page showing a list of categories of products which may be purchased by the consumer to fulfill its obligation to earn points.

The web page shows an asset choice display screen 22 which contains a series of product categories 24 and series of asset types 26 for each product category 24. Examples of categories 24 include appliances, automobiles, books, clothes and accessories and computers. Any number of and any desired categories of assets (whether products or services) can be included. The user navigates asset choice display screen 22 to locate and select a specific category of asset that he or she wishes to purchase and then selects asset type 26 he or she is interested in within the selected category 24.

For example, a buyer can select automobiles from category 24, and navigate asset type 26 to select mid-size vehicles. The consumer 12 is then presented with a manufacturers display screen 28 such as that shown in FIG. 5.

Figure 5:
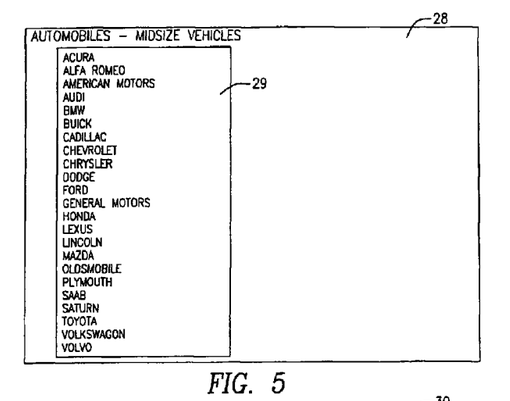
FIG. 5 is a web page showing a plurality of brands of automobiles which may be purchased by a consumer to fulfill its obligation to earn points.

FIG. 5 includes a list of automobile manufactures 29 which enables the consumer 12 to narrow his or her choices. He or she selects the desired choice, e.g., Honda®, in any appropriate manner, such as by clicking on the portion of the screen corresponding to the Honda selection and is then presented with the next user display screen shown in FIG. 6.

Figure 6:
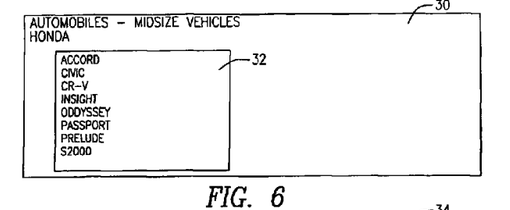
FIG. 6 is a web page showing a list or models of a brand of vehicle which may be purchased by a consumer to fulfill its obligation to earn points.
Figure 7:
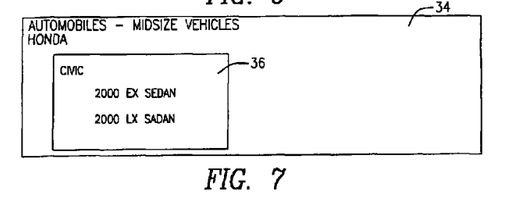
FIG. 7 is a web page showing sub models of a brand of vehicles which may be purchased by a consumer to fulfill its obligation to earn points.

FIG. 6 shows an example of asset models display screen 30 which shows a list 32 of the types of mid-sized vehicles sold by Honda. The desired model, category, for example, Accord®, Civic®, or Prelude®, can be selected by the consumer 12. Assuming the consumer 12 selects Honda Civic®, he or she is presented with a display screen 34 shown in FIG. 7. Display screen 34 contains a list 36 of the sub-models of the Honda Civic® and the consumer 12 selects the sub-model of interest.

Figure 8:
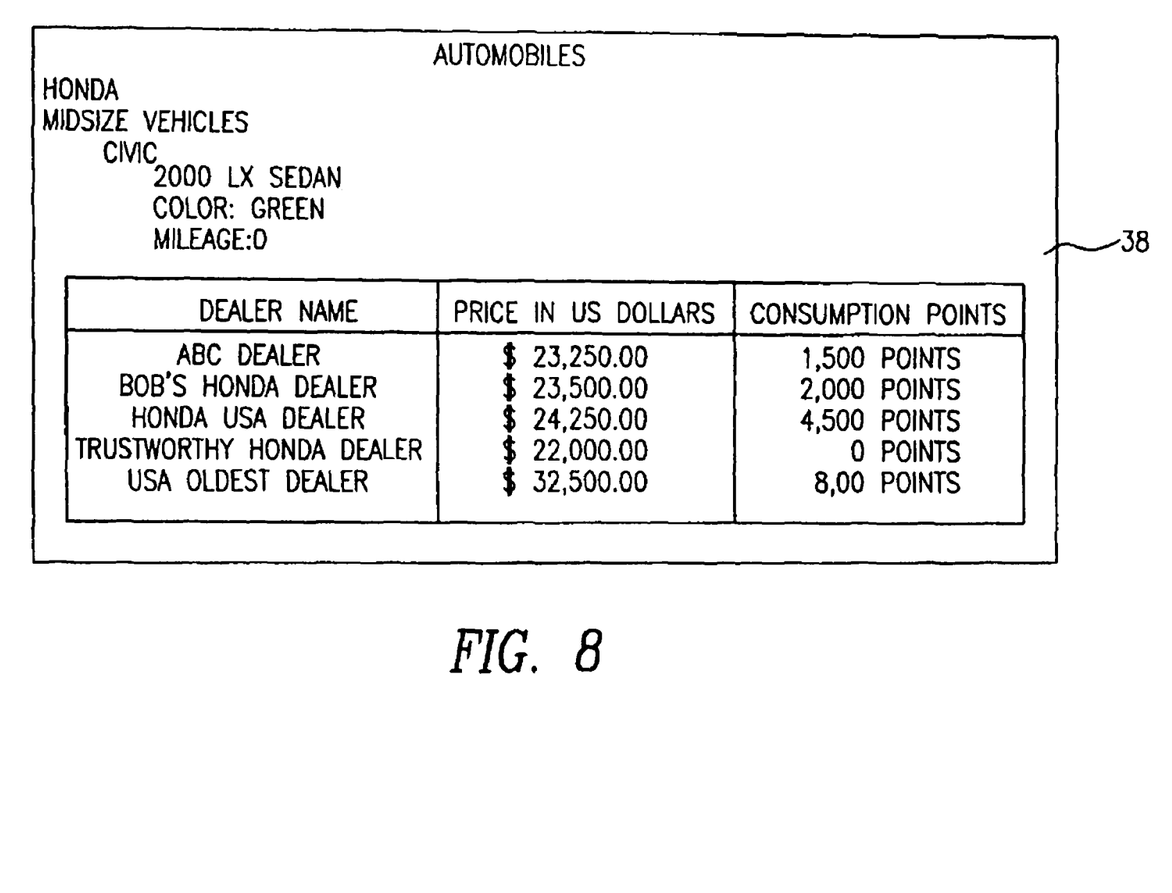
FIG. 8 is a web page showing a plurality of suppliers who offer the sub-model of vehicle at different price/consumption point levels.

FIG. 8 shows an example of vendor display screen 38 showing a plurality of suppliers 14 who are offering a Honda Civic 2000 LX Sedan. In this example, five dealers are offering a green Honda Civic LX® Sedan for sale. Each supplier offers a green Honda Civic LX® Sedan at a different price/consumption point combination. Depending upon the consumer's outstanding consumption point balance, certain deals may be more or less attractive to them. Assuming that each consumption point is effectively worth one dollar ($1.00), the deal presented by Honda USA Dealer is arguably the best deal. The net cost of the car to the consumer will be $20,000.00 (i.e., $24,500.00 less the value of 4,500 consumption points at $1.00 per point). However, this will only be true if the consumer 12 has an obligation to earn at least 4,500 consumption points. Additionally, if he or she is paying a large interest rate on his or her consumption point balance, this deal will become more attractive. In contrast, a consumer 12 with no obligation point balance would probably consider the Trustworthy Honda Dealer price of $22,000.00 to be most attractive. A wide variation in prices and consumption points provides the consumer 12 with a rich variety of options. The particular option which will be most attractive to a given consumer will be dependent upon his or her personal circumstances.

When a consumer 12 locates an offer at a price/consumption point level that is satisfactory to him or her, he or she selects the offer in any convenient manner, for example, by using a mouse or other pointing device, thereby entering into a transaction with the selected supplier 14, for example ABC Dealer. Various forms of payment and/or financing can be provided to enable the consumer 12 to purchase the vehicle. Whatever particular type of financing is agreed to, a direct payment of the full purchase price is preferably made to the financial institution 20 who will then retain a dollar amount equal to the number of consumption points earned ($1,500.00 if the ABC Dealer's offer is accepted) and also withholds a transaction fee (e.g., 3% of the purchase price or $697.50) agreed to in advance between the financial institution 20 and the supplier 14. The financial institution 20 then pays the net amount of $21,052.50 ($23,250.00 minus $1,500.00 minus $697.50) to the ABC Dealer. While it is preferred that the payment be made to financial institution 20, it is within the scope of the invention to make the payment directly to the supplier 14 who then pays the appropriate fees to the financial institution 20 or alternatively, to make the payment to a trusted third party who divides the payment between the supplier 14 and the financial institution 20.

While earned consumption points are normally used to pay off an outstanding balance of consumption points, it is possible to permit the consumer 12 to have a negative consumption point balance (i.e., to have earned more consumption points than he or she owed). In such case, these consumption points can be used to obtain products and/or services for free as with many existing incentive-based point systems presently in the market, for example, MyPoints.com.

Figure 3:
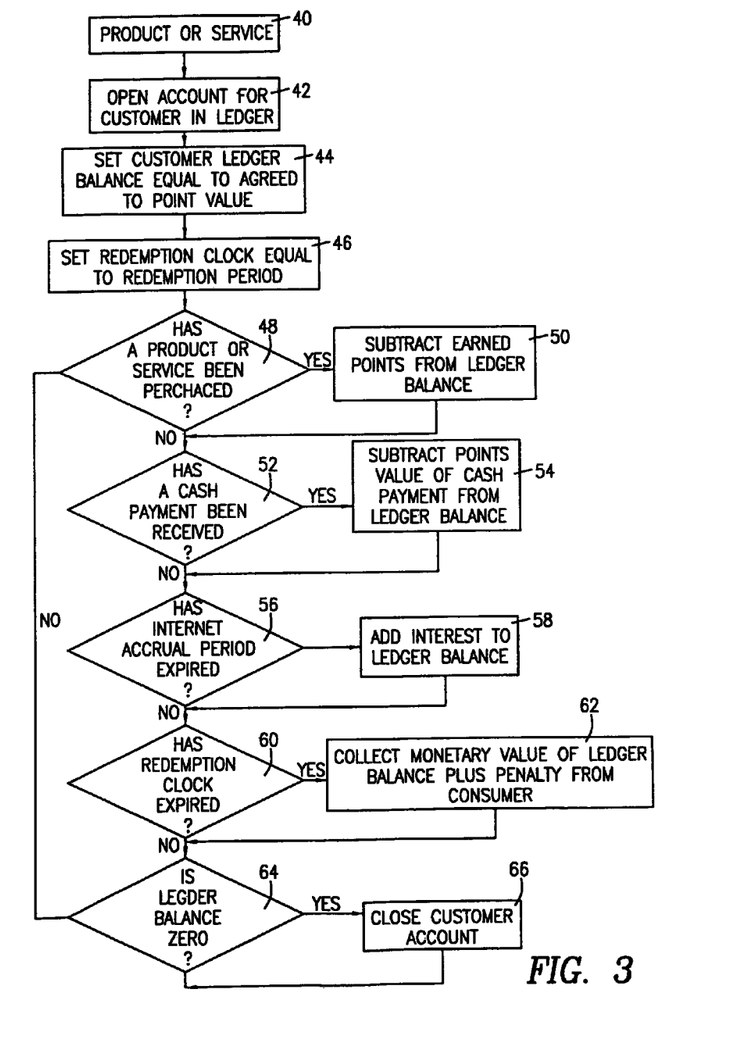
FIG. 3 is a flow diagram showing the manner in which a ledger can be maintained to determine a balance of consumption points which must be earned by the consumer.

The financial institution 20 (or an entity working with or on behalf of the financial institution 20), must maintain a ledger of accounts determining the various consumption point obligations accrued by the consumer's 12 as their fulfillment of those obligations. A simple, non limiting, example of how this accounting can be carried out is shown in FIG. 3.

Starting at block 40, the consumer selects a product and/or service at the commitment web site 16. Upon selection of the particular product or service, a consumer account is opened for the customer 12 in a ledger as shown in step 42. As described below, a formal registration process will preferably take place in which the consumer provides various information to the financial institution who will then determine whether and under what conditions the consumer will be able to participate in the electronic marketplace 10.

The consumer account preferably includes information concerning the consumer, for example his or her name, address, social security number and, if available, credit rating. The credit rating could be determined, for example as a function of the consumer's prior credit history. It can also be determined by analyzing the consumers future ability and willingness to fulfill their obligations or future ability and need to purchase second assets. Alternatively, the consumer's credit history itself can be stored. With the consumer's permission, a credit card and/or bank account number of the consumer, against which the financial institution can charge a payment in the event of the consumer's failure to meet its obligations to the financial institution, can be stored.

The ledger includes a ledger balance for the consumer 12 indicating the current consumption point balance which must be satisfied by the consumer 12. As shown in step 44, the ledger balance is initially set to be equal to the point value of the product or service purchased at the commitment web site 16. For example, if the consumer 12 has obtained a product for 1,500 consumption points, the ledger balance is set at 1,500.

In step 46, a redemption period clock, corresponding to the redemption period, is initiated. For example, if the redemption period is two years, the redemption clock will initially be set at two years and will count down on a daily basis until it expires.

At step 48, a determination is made as to whether a product or service has been purchased at the sales web site 18. If it has, the number of consumption points earned as a result of the purchase are subtracted from the ledger balance (step 50).

When no product or service has been purchased, or if a product or service has been purchased and the consumption points have been subtracted from the ledger balance, the system determines whether a cash payment has been received from the customer 12 as partial or total payment of the consumption point balance (step 52). If it has, the point value corresponding to the cash payment is subtracted from the ledger balance (step 54).

If no cash payment has been received, or if one has been received and the corresponding consumption points have been subtracted from the ledger balance, the system proceeds to step 56 where it determines whether the interests accrual period has expired. The interest accrual period can be any desired period, typically monthly or quarterly. If it has expired, interest is added to the ledger balance (step 58).

The interest added to the ledger balance can be constant or variable. If constant, a preset percentage, e.g., 1% per month, is added to the ledger balance at the end of each accrual period. In order to further encourage the purchase of products on sales web site 18, it is preferred that the interest rate increase over time. For example, a 1% interest rate can be applied for each month during the first 6 months of the payback period, 1¼% can be added during each months of the second 6 months, 1½% during the third 6 months, etc.

If the interest accrual period has not expired or, alternatively, if it has and interest has been added to the ledger balance, the system determines whether the redemption period has expired (step 60). If it has, the customer has failed to meet its obligation within the redemption period and he or she must now make a monetary payment to the financial institution 20 equal to the monetary value of the ledger balance. In the preferred embodiment, a penalty will also be charged to the consumer 12. Payment of the outstanding balance (plus penalty) can be made in any suitable manner. It can be made by having the consumer 12 make a direct payment to the financial institution 20 (e.g., by making a check payment, making a cash payment, making a bank transfer or by authorizing a credit or debit card charge to an appropriate account) or by automatically debiting a bank account or credit card account previously identified by the consumer 12 at the time he or she purchased the product or service at commitment web site 16 (or registered at the commitment web site 16). In the latter case, the consumer 12 would have previously agreed to permit the financial institution 20 to debit such bank account or credit card in the event the consumer failed to reduce his or her ledger balance to zero by the end of the redemption period.

If the redemption period has not expired, the system determines if the ledger balance is zero (step 64). If it is, it closes the account of the customer (step 66). If not, the system returns to step 48 and once again determines if any product or service has been purchased.

In the foregoing embodiment, a separate ledger account is opened for each product and/or service purchased by the consumer 12 at the commitment web site 16. Alternatively, a single ledger account can be maintained for each consumer and the single account can keep track of all of the purchases made by the consumer at both the commitment web site 16 and the sales web site 18 (as well as any monetary payments made by the consumer). In this case, an appropriate modification for dealing with varying redemption periods must be made.

In the foregoing embodiment, the ledger account is closed once the consumer has reduced its ledger balance to zero. If desired, the ledger balance may be kept open and future purchases on commitment web site 16 will be applied to that ledger account. Additionally, it is possible for the ledger account to keep track of consumption points earned at the sales web site 18 which are over and above those required to bring the ledger balance to zero. These additional consumption points (a negative balance) can be used by the consumer 12 to obtain free products and services much like conventional incentive-based systems.

In the preferred embodiment, the web sites 16 and 18 are shown as being two separate web sites. However, they can be combined into a single web site. Alternatively, each of the web sites 16 and 18 may themselves be formed from a plurality of web sites.

In the preferred embodiment, the consumers 12, suppliers 14, commitment web site 16, sales web site 18 and financial institution 20 are all connected together electronically. However, any other forms of communication between the various entities in the marketplace 10 can be used. For example, consumers 12 can be provided with catalogs corresponding to the products and services sold on commitment web site 16 and sales web site 18 and can send in his or her orders by mail, by phone, etc. Similarly, live retail locations can be used in lieu of, or in addition to, the commitment web site 16 and/or the sales web site 18.

As indicated above, a registration process is preferably carried out when a consumer first requests access to the electronic marketplace 10. This could be carried out, for example, in step 42 of FIG. 3 when the account for the customer is opened in the ledger. Various credit screening can be done at this point and the financial institution can accept or reject the customer before it enables the customer to obtain any products on commitment web site 16. Additionally, the financial institution can vary the interest rate and/or require various transactional fees as a function of the credit worthiness of the consumer.

In the embodiments described above, the assets obtained by the consumers 12 at the commitment web site 16 are products or services. If desired, the consumer 12 can also be provided with the option of obtaining an up-front cash payment (the first asset) in return for its commitment to purchase products and/or services on sales web site 18.

In the foregoing embodiments, a single financial institution 20 is shown. However, a plurality of financial institutions can cooperate to finance the transactions taking place in the electronic trading system 10.

As noted above, it is preferred that an incentive be provided to the consumer to earn consumption points as soon as possible. One possible incentive is the accrual of interest on the outstanding consumption point balances described above. However, any desirable incentive can be provided. For example, a discount can be provided, for example, the consumer's obligation can be fulfilled if it earns 95% of the required consumption points within a six month period. Additionally, bonus points can be provided for early satisfaction of the consumption point obligation.

The present invention advantageously provides a comprehensive network-based facility offering a variety of participants in the product chain to engage in transactions with each other using, e.g., a simple web browser interface. A plurality of users can simultaneously log into the marketplace 10 to buy and sell assets. By web enabling electronic marketplace 10, all users are afforded twenty-four hour per day availability. Consumers and suppliers can study the market at their convenience and receive relatively easy to find, comprehensive asset information.

The present invention advantageously functions to offer goods and services in advance from a plurality of companies which can be obtained by promising to purchase goods and/or services in the future from related and/or unrelated suppliers. The present invention advantageously encourages many parties to participate for the following reasons. Consumers have incentive to use electronic marketplace 10 for several reasons. Initially to receive an asset up front without any cash payment. Additionally, the price of goods and services at the sales web site will likely be highly competitive due to large scale volume movement of goods and services at that site. Consumers will also be seeking to satisfy their consumption point obligations. Suppliers will want to use electronic marketplace 10 because of a significant demand for their goods and services. Financial institutions will have incentive to participate in marketplace 10 because of potential returns on their investments. By web enabling the marketplace, the system will operate twenty-four hours a day and reach a larger audience than a marketplace bound by specific hours of operation.

As used herein, the term "set" refers to a set of one or more elements. For example, a first set of suppliers includes one or multiple suppliers. A first set of assets includes one or more assets.

The first set of assets may be provided to the consumer by one or more first suppliers. The first suppliers can have title to the assets that they provide and/or can merely act as an intemediary (e.g., an agent) in connection with the supply of those assets to the consumer. That is, title to the first assets can be with one or more third party suppliers and the first suppliers can merely act as an intermediary for those suppliers. In the later case, the financial institution (or other third party financing the underlying transactions) can pay the first suppliers for the first assets transferred or can pay the third party suppliers directly, depending on the preferences of the parties to the agreement.

In a similar manner, the second suppliers can sell second assets that they have title to and/or can sell second assets owned by third party suppliers. In the later case, the second suppliers act as an intemediary (e.g., an agent) for the third party suppliers. The consumer can make payments to either the second suppliers or directly to the third party suppliers, depending upon the preferences of the parties to the agreement. In either event, the financial institution (or other third party financing the underlying transactions) will receive a portion of each such payment.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A computerized process for assisting in the marketing of products and/or services, said computerized process comprising:
   entering information into an electronic database including a computerized ledger, via one or more communication interfaces, to assist in the marketing of products and/or services, said information being related to
   i. a first set of one or more assets provided to a consumer from a first set of one or more suppliers; and
   ii. compensation provided by the consumer, the compensation comprising at least a promise to make future purchases of one or more second assets in return for receiving said first set of assets prior to fulfillment of the promise by the consumer, at least one of said second assets being different than said assets of said first set of assets;
   opening an account for the consumer in the computerized ledger upon consumer receipt of the first set of one or more assets and receipt of the promise from the consumer to make future purchases of the one or more second assets, the computerized ledger storing a promise fulfillment period for the account and receiving updates on consumer activities related to promise fulfillment after consumer receipt of the first set of one or more assets;
   evaluating upon expiration of the promise fulfillment period, using a computer processor, the account maintained in the computerized ledger for monitoring promise fulfillment based on activities of the consumer subsequent to the promise; and
   if the promise has not been fulfilled, determining any additional steps required from the consumer to fulfill the promise.

2. The computerized process according to claim 1, wherein said second assets are each a different category of assets than said one or more assets of said first set of assets.

3. The computerized process according to claim 1, wherein said first set of assets consists of a single asset.

4. The computerized process according to claim 3, wherein said first set of suppliers consists of a single supplier.

5. The computerized process according to claim 1, wherein said first set of assets comprises a plurality of assets, at least two of which are different categories of assets.

6. The computerized process according to claim 5, wherein said first set of suppliers comprises a plurality of suppliers.

7. The computerized process according to claim 1, wherein said first set of suppliers comprises a plurality of suppliers.

8. The computerized process according to claim 1, wherein at least one of said second assets is purchased from a supplier that is part of said first set of suppliers and at least one other of said second assets is purchased from a supplier that is not part of said first set of suppliers.

9. The computerized process according to claim 1, wherein all of said second assets are purchased from suppliers that are not part of said first set of suppliers.

10. The computerized process of claim 1, wherein at least one supplier of said first set of suppliers is a financial institution.

11. The computerized process of claim 1, wherein each of said first set of assets is a product and at least one of said second assets is a service.

12. The computerized process according to claim 1, wherein each asset of said first set of assets is a product and at least one of said second assets is a product and at least another of said second set of assets is a service.

13. The computerized process according to claim 1, wherein each asset of said first set of assets is a service and at least one of said second assets is a product.

14. The computerized process according to claim 1, wherein each asset of said first set of assets is a first service and at least one of said second assets is a second service which is different in kind than said first service.

15. The computerized process according to claim 1, wherein said consumer selects at least one asset of said first set of assets from a plurality of different offered assets, at least two of said offered assets being offered by different suppliers.

16. The computerized process according to claim 15, further including offering at least some of said offered assets at a web site over a global communication network.

17. The computerized process according to claim 1, further including entering information into a database relating to payments received by:
   said first set of suppliers from a third party in return for supplying said first set of assets to said consumer; and
   said third party each time said consumer purchases one of said second assets.

18. The computerized process according to claim 17, wherein said second assets are sold by at least one supplier of said first set of suppliers.

19. The computerized process according to claim 18, wherein each said payment is a portion of a purchase price of a respective said second asset purchased by said consumer.

20. The computerized process according to claim 17, wherein each said payment is a portion of a purchase price of a respective said second asset purchased by said consumer.

21. The computerized process according to claim 17, further including entering information into said database:
   relating to a payment made by said consumer to said third party or its designee when said consumer makes a purchase of one of said second assets; and
   relating to the relative portions of said payment which are split between said supplier of said second asset and said third party.

22. The computerized process according to claim 1, further including offering said second assets over a global communication network.

23. The computerized process according to claim 22, wherein said first assets are offered over said global communication network.

24. The computerized process according to claim 23, wherein said first assets are listed on a single web site.

25. The computerized according to claim 1, further including offering said first and second assets over a global communication network.

26. The computerized process according to claim 1, wherein at least one of said first set of suppliers provides said consumer with at least one asset of said first set of assets which is owned by it.

27. The computerized process according to claim 1, wherein at least one of said first set of suppliers provides said consumer with at least one asset of said first set of assets which is owned by a third party supplier and acts as intermediary for said third party supplier.

28. A computerized process for assisting in the marketing of products and/or services, said computerized process comprising:
   providing a plurality of consumers and at least one supplier with one or more communication interfaces to access an electronic trading system;
   electronically storing information in an electronic database for assisting in the marketing of products and/or services in said electronic trading system, the electronic database including a computerized ledger, said information relating to:
      a first set of one or more assets provided to a consumer from a first set of one or more suppliers; and
      an agreement made by said consumer, in return for receiving said first set of assets prior to fulfillment of the agreement, to make future purchases of one or more second assets from a second set of one or more suppliers, said second set of suppliers including at least one supplier which is not included in said first set of suppliers;
   opening an account for the consumer in the computerized ledger upon consumer receipt of the first set of one or more assets and receipt of the agreement from the consumer to make future purchases of the one or more second assets, the computerized ledger storing an agreement fulfillment period for the account and receiving updates on consumer activities related to agreement fulfillment after consumer receipt of the first set of one or more assets;
   evaluating upon expiration of the agreement fulfillment period, using a computer processor, the account maintained in the computerized ledger to monitor agreement fulfillment based on activities of the consumer subsequent to the agreement, to determine agreement fulfillment status; and
   if the agreement has not been fulfilled, determining any additional steps required from the consumer to fulfill the agreement.

29. The computerized process according to claim 28, wherein said first set of assets consist of a single asset.

30. The computerized process according to claim 29, wherein said first set of suppliers consists of a single supplier.

31. The computerized process according to claim 28, wherein said first set of assets comprises a plurality of assets, at least two of which are different categories of assets.

32. The computerized process according to claim 31, wherein said first set of suppliers comprises a plurality of suppliers.

33. The computerized process according to claim 31, further comprising offering said second assets over a global communication network.

34. The computerized process according to claim 33, wherein said second assets are listed on a single web site.

35. The computerized process according to claim 34, further comprising offering said first assets over said global communication network.

36. The computerized process according to claim 28, wherein said first set of suppliers comprises a plurality of suppliers.

37. The computerized process according to claim 28, wherein at least one of said second assets is purchased from a supplier that is part of said first set of suppliers and at least one other of said second assets is purchased from a supplier that is not part of said first set of suppliers, and when information concerning which assets are purchased from which suppliers by said consumer are electronically stored.

38. The computerized process according to claim 28, wherein all of said second assets are purchased from suppliers that are not part of said first set of suppliers and when information about said purchases are electronically stored.

39. The computerized process according to claim 28, wherein at least one supplier of said first set of suppliers is a financial institution.

40. The computerized process according to claim 28, wherein each asset of said first set of assets is a product and at least one of said second assets is a service.

41. The computerized process according to claim 28, wherein each asset of said first set of assets is a product and at least one of said second assets is a product and at least another of said second set of assets is a service.

42. The computerized process according to claim 28, wherein each assets of said first set of assets is a service and at least one of said second assets is a product.

43. The computerized process according to claim 28, wherein each asset of said first set of assets is a first service and at least one of said second assets is a second service which is different than said first service.

44. The computerized process according to claim 28, wherein said consumer selects at least one asset of said first set of assets from a plurality of different offered assets, at least two of said offered assets being offered by different suppliers.

45. The computerized process according to claim 44, wherein at least some of said offered assets are offered at a web site over a global communication network.

46. The computerized process according to claim 28, wherein:

said first set of suppliers receives a payment from a third party in return for supplying said first set of assets to said consumer;

said third party receives a payment each time said consumer purchases one of said second assets; and information concerning said payments is stored electronically.

47. The computerized process according to claim 46, wherein at least some of said second assets are sold by at least one supplier of said first set of suppliers.

48. The computerized process according to claim 47, wherein each said payment is a portion of a purchase price of a respective said second asset purchased by said consumer.

49. The computerized process according to claim 46, wherein each said payment is a portion of a purchase price of a respective said second asset purchased by said consumer.

50. The computerized process according to claim 46, wherein said consumer pays said third party or its designee said purchase price when said consumer makes a purchase of one of said second assets and said third party or its designee splits at least part of said purchase price between said supplier of said second asset and said third party, wherein information concerning how said purchase price is split is stored electronically.

51. The computerized process according to claim 28, further comprising offering said first and second assets are offered over a global communication network.

52. The computerized process according to claim 28, further comprising listing said first and second assets on a single web site.

53. The computerized process according to claim 28, wherein at least one of said suppliers of said first set of suppliers provide said consumer with an asset of said first set of assets which is owned by it.

54. A computerized process according to claim 28, wherein at least one of said first set of suppliers provides said consumer with at least one said second asset which is owned by a third party supplier and acts as an intermediary for said third party supplier.

55. A computerized process according to claim 28, wherein at least one of said second set of suppliers supplies said consumer with a second asset owned by it.

56. A computerized process according to claim 28, wherein at least one of said second set of suppliers provides said consumer with at least one said second asset which is owned by a third party supplier and acts as an intermediary for said third party suppliers.

57. The computerized process according to claim 28, wherein said first set of one or more assets are selected from a group consisting of:
- automobiles;
- electronics;
- consumer goods;
- appliances;
- baby gear;
- books;
- clothes;
- computers;
- music;
- software;
- music recordings;
- advertising services;
- travel services;
- automotive services;
- financial services; and
- music services.

58. The computerized process according to claim 28, wherein said second set of one or more assets are selected from a group consisting of:
- automobiles;
- electronics;
- consumer goods;
- appliances;
- baby gear;
- books;
- clothes;
- computers;
- music;
- software;
- music recordings;
- advertising services;
- travel services;
- automotive services;
- financial services; and
- music services.

* * * * *

UNITED STATES PATENT AND TRADEMARK OFFICE
CERTIFICATE OF CORRECTION

| | | |
|---|---|---|
| PATENT NO. | : 8,458,018 B1 | Page 1 of 1 |
| APPLICATION NO. | : 09/695093 | |
| DATED | : June 4, 2013 | |
| INVENTOR(S) | : Donelian | |

It is certified that error appears in the above-identified patent and that said Letters Patent is hereby corrected as shown below:

On the Title Page, Item [56] should read:

U.S. Patent No. 6,405,174 to Walker et al.

Signed and Sealed this
Twenty-fifth Day of February, 2014

Michelle K. Lee
*Deputy Director of the United States Patent and Trademark Office*